(12) United States Patent
Boudreaux, Jr.

(10) Patent No.: US 6,628,782 B1
(45) Date of Patent: Sep. 30, 2003

(54) RING VOLTAGE TERMINATION BY MEANS OF A SPARE FUSE

(75) Inventor: Ralph R. Boudreaux, Jr., Madison, AL (US)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 09/426,846

(22) Filed: Oct. 26, 1999

(51) Int. Cl.[7] .................................................. H04M 1/00
(52) U.S. Cl. .............. 379/412; 379/413.01; 379/413.02
(58) Field of Search ............................ 379/413, 413.01, 379/413.02, 413.03, 399.01, 402, 413.04, 414, 382, 383, 390.04, 398, 26.01, 412

(56) References Cited

U.S. PATENT DOCUMENTS

| | | | | |
|---|---|---|---|---|
| 5,037,167 A | * | 8/1991 | Beaty ........................... | 379/329 |
| 5,182,547 A | * | 1/1993 | Griffith ........................ | 379/413 |
| 5,534,768 A | * | 7/1996 | Chavannes et al. ........... | 323/267 |
| 5,594,404 A | * | 1/1997 | Happ et al. ................... | 337/210 |
| 5,809,109 A | * | 9/1998 | Moyal et al. ................. | 379/22 |
| 6,278,778 B1 | * | 8/2001 | Abdollahi et al. ........... | 379/373 |
| 6,418,221 B1 | * | 7/2002 | Snow et al. .................. | 379/399.01 |

* cited by examiner

Primary Examiner—Rexford Barnie
(74) Attorney, Agent, or Firm—Allen, Dyer, Doppelt, Milbrath & Gilchrist, P.A.

(57) ABSTRACT

During maintenance of telephony equipment the high voltage ring signals for POTS lines must be disconnected or disabled so as to remove the shock hazard potential associated with the substantially elevated ringing voltage present at a line card of a central office. This problem is effectively obviated by installing a three-terminal alarm fuse socket in a circuit path for the ringing generator, and wiring the socket's terminals to enable the fuse to operate as a switch. The switch is closed by inserting a (blown or unblown) three-pin alarm fuse. This enables a ringing voltage generated by the ringing voltage generator to be applied to the span and delivered to the ringing circuit of the handset. The switch is opened by removing the fuse. Ringing voltage functionality for and/or connectivity with the ringing voltage circuit is selectively dependent upon whether a fuse is installed in the receptacle, irrespective of the state of the fuse. Configuring the ring fuse socket to accommodate a three-pin alarm-indicating type fuse in such a non-standard 'switch' configuration allows the ring termination fuse to function as a 'spare' system alarm fuse that can be swapped out for another alarm fuse that has blown. The ringing fuse socket will continue to enable or disable the ringing voltage depending on the presence or absence of a 'blown' or 'unblown' fuse cartridge.

21 Claims, 2 Drawing Sheets

RING VOLTAGE TERMINATION BY MEANS OF A SPARE FUSE

FIELD OF THE INVENTION

The present invention relates in general to communication systems and circuits therefor, and is particularly directed to the use of a modified alarm fuse receptacle wired as a ringing voltage switch, so as to selectively provide connectivity for a ringing voltage circuit, in a manner that is effective to protect maintenance personnel servicing telephone equipment from a ringing voltage shock hazard.

BACKGROUND OF THE INVENTION

The operation of the ringing circuit for a standard (plain old telephone service, or POTS) analog telephone installed at a subscriber premises typically requires the application of a ringing voltage of at least 40 Vrms to the customer's handset. As diagrammatically illustrated in FIG. 1, the ringing voltage is customarily generated remotely by a ringing voltage generator 11 for a line card 13 installed in a channel bank of a central office (CO) 10. Because there can be a significant (voltage dropping) distance over the metallic span 21 between the source of the ringing voltage (the line card 13) and the subscriber's handset 23, the ringing voltage generated at the central office will normally be much higher than 40 Vrms. As a non-limiting example, the ringing voltage at the line card 13 may be on the order of 105 Vrms. This substantially elevated voltage produced by the ringing voltage generator poses a shock hazard to service personnel that must be avoided during equipment maintenance (e.g., adding or removing line cards in the channel bank, etc). Moreover, it is preferable to disable only the ringing voltage generator during these times, so that non-ringing POTS lines remain functional.

SUMMARY OF THE INVENTION

In accordance with the present invention, this objective of protecting telephone equipment maintenance personnel from a potentially hazardous ringing voltage, while allowing other POTS functionality to be operational, is successfully achieved by installing a three-terminal alarm fuse socket or receptacle in a circuit path for the ringing voltage generator, and wiring the fuse socket's terminals to operate as a switch. The switch is closed by inserting a three-pin fuse (which may either blown or unblown) into the socket, so as to enable a ringing voltage generated by the ringing voltage generator to be applied to the span and delivered thereby to the ringing signal circuit of the handset. The switch is opened by simply removing the fuse. Thus, ringing voltage functionality for and/or connectivity with the ringing voltage circuit is dependent upon whether a fuse is installed in the socket, regardless of the state of the fuse.

The fuse socket itself has a first terminal at one end thereof connected to a first location of an operation-enabling current flow path of the ringing voltage generator. Second and third terminals at a second end of the socket are coupled in common to a second location of the ringing generator's current flow path in which the alarm fuse socket is installed. The fuse receptacle is sized to receive a three-terminal, or three-pin fuse cartridge, commonly referred to as an alarm indicating fuse, having a source electrode, a load electrode and an alarm electrode. The fuse cartridge has a flexible, tensioned conductor affixed to the source electrode and normally biased against and held by a fusible element adjoining the load electrode.

With this three-pin configuration, the alarm fuse normally provides electrical connectivity between its source and load electrodes. For an overcurrent condition, however, the fusible element is severed—blowing the fuse—causing the tensioned conductor to flex away from the load electrode and into physical and electrical contact with the alarm electrode. In a customary three-terminal alarm fuse installation, the alarm terminal of the receptacle is connected to an alarm output, so that when the fuse blows, an alarm indication may be generated.

According to the invention, however, since the load and alarm terminals of the fuse socket are wired in common, it makes no difference whether an 'unblown' fuse or a 'blown' fuse is installed. In either case, a closed electrical path is provided through the fuse and thereby through the operation-enabling current flow path of the ringing voltage generator. Namely, wiring the socket so that the alarm and load pins of the fuse are effectively electrically shorted together forces a connection between the source and load pins regardless of the state of the fusing element (as long as the fuse cartridge is inserted in the socket). This effectively disables the fusing at functionality and forces the cartridge to function as a simple switch, so that the ringing voltage will be enabled or disabled by the insertion or removal of the fuse cartridge.

In a first, preferred embodiment of the invention, the socket is installed at a location that controls the enable signal of the ringing voltage generator, which prevents a hazardous voltage from being generated once the ring fuse cartridge is removed from its socket. It is also possible to place the fuse in series with the power source of the ringing voltage generator.

In a second embodiment of the invention, intended for use with an external ringing voltage generator, the socket is connected such that the load and alarm terminals are connected in common to the line card, while the source terminal is connected to the external ringing voltage generator. As in the first embodiment, the second embodiment also directly interrupts the ringing voltage when the ring fuse cartridge is removed from its socket. This embodiment is somewhat less desirable than the first, since the ringing voltage is actually presented to the fuse, and may violate safety requirements. Also, this approach only blocks the ringing voltage from reaching the line card. The source side of the fuse still has a ringing voltage present. Another technique to directly interrupt the ringing voltage (as in the case of an external source), without imposing a hazardous voltage on the fuse, is to have the fuse control a relay (which then interrupts the voltage).

DETAILED DESCRIPTION

Figure 1:
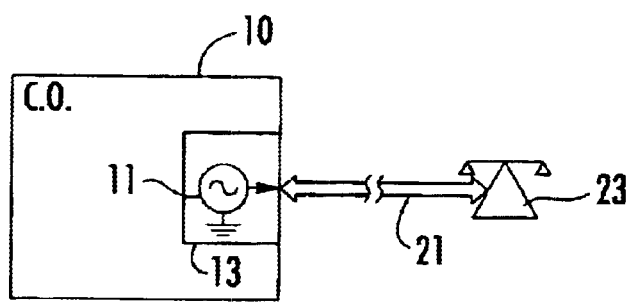
FIG. 1 diagrammatically illustrates the supply of a ringing voltage for a POTS analog telephone at a subscriber premises from a ringing voltage generator in a central office.

As pointed out briefly above, the modified alarm fuse installation scheme of the present invention is configured to selectively provide ringing voltage connectivity for the ringing circuit by means of a switch-configured fuse socket architecture, that enables telephone equipment maintenance personnel to effectively disable the source of ringing voltage and thereby provide protection against a ringing voltage shock hazard. In accordance with a non-limiting but preferred embodiment, shown diagrammatically in FIG. 2, the invention employs a three-terminal fuse socket connected in circuit with the current flow path of a ringing voltage generator in such a manner, that absent installation of a three-pin alarm fuse cartridge in the socket, the operational current flow path for the ringing voltage generator will be interrupted.

More particularly, a standard three pin alarm fuse socket 30 has a first terminal 31 at one end thereof connected to a first location 41 of an operation-enabling current flow path 40 of the ringing voltage generator 11, and second and third terminals 32 and 33 at a second end thereof wired in common to a second location 42 of the current flow path 40. The fuse receptacle 30 is sized to receive a three-terminal, or three-pin fuse cartridge 50, commonly referred to as an alarm indicating fuse, having a first (source) electrode 51, a second (load) electrode 52 and a third (alarm) electrode 53. A flexible, tensioned conductor 54 has one end thereof affixed to the first electrode 51, and a second end mechanically biased into contact with and held by a fusible element 55, adjoining the second electrode 52.

With this three-pin configuration, the alarm fuse 50 is operative to normally provide electrical connectivity through the flexible conductor 54 between its first and second electrodes 51 and 52. For an overcurrent condition, the fusible element 55 will be severed—blowing the fuse—causing the second end of the conductor 54 to flex away from the second electrode 52 and into physical and electrical contact with the third electrode 53. In a customary three-terminal alarm fuse installation, the third terminal of the receptacle 30 is connected to an alarm output, so that when the fuse blows, an alarm indication may be generated.

Figure 2:
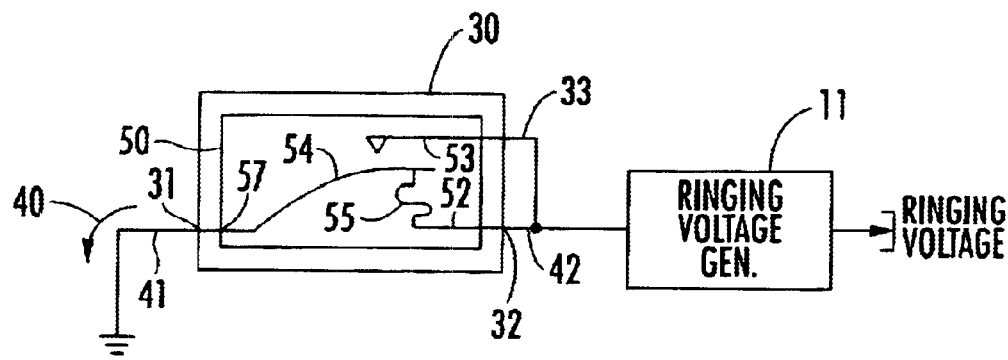
FIG. 2 diagrammatically illustrates a three-terminal fuse socket wired in the operational enabling path of a ringing voltage generator for a first embodiment of the invention.
Figure 3:
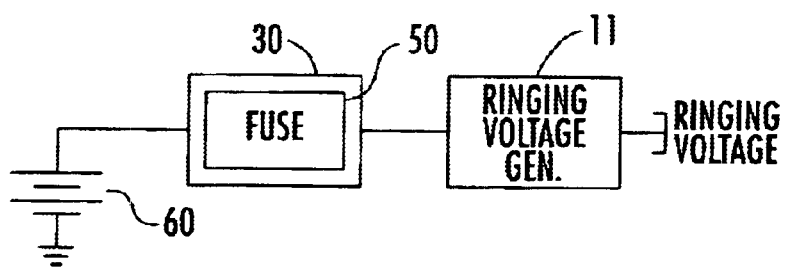
FIG. 3 diagrammatically illustrates a modification of the embodiment of FIG. 2, wherein the fuse socket is connected in series with a power source of the ringing voltage generator.

Pursuant to the present invention, since the fuse cartridge terminals 32 and 33 are wired in common, it makes no difference whether an 'unblown' fuse or a 'blown' fuse is installed in the socket 40, in order to provide a closed electrical path through the conductor 54 between the first and second locations 41 and 42 of the operation-enabling current flow path 40 of the ringing voltage generator 11. In the embodiment of FIG. 2, installing a fuse in the socket serves to control the enable signal of the ringing voltage generator. As shown, when the enable line for the ringing voltage generator 11 is electrically coupled to ground, a ringing voltage is generated. Otherwise the ringing voltage generator 11 is disabled or turned off. Namely, wiring the socket 30 so that the alarm and load pins are shorted forces a connection between the source and load pins regardless of the state of the fusing element (as long as the fuse cartridge is inserted in the socket). As shown in FIG. 3, it is also possible to place the fuse socket 30 in series with a power source 60 of the ringing voltage generator 11.

The wiring configuration of the socket effectively disables the fusing functionality and forces the cartridge to function as a simple switch. The condition of the meltable fusing element 55 is irrelevant since the ring voltage will be enabled or disabled by the insertion or removal of the cartridge. This means that in order to interrupt the operation of the ringing voltage generator 11, it is necessary to physically remove the fuse cartridge 50 from the fuse socket 40, so that the alarm fuse effectively functions as a manually operated switch, rather than as a fuse, with ringing voltage being provided only as long as a fuse cartridge is installed in the socket. This provides two benefits. First, physically removing the fuse is a positive indication of a safe chassis and is not likely to be accidentally installed or removed. In addition, configuring a three-pin alarm-indicating type fuse in a non-standard switch configuration allows the ring termination fuse to function as a 'spare' for another fuse.

Figure 4:
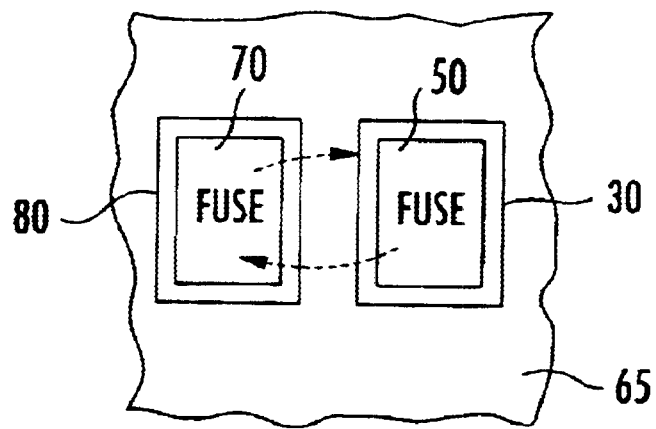
FIG. 4 diagrammatically illustrates multiple three-pin alarm fuses installed in a ring fuse socket and another alarm fuse socket.

As a non-limiting example, FIG. 4 diagrammatically illustrates a typical installation of side-by-side fuses at a line card front panel 65, wherein three-pin alarm fuses 50 and 70 are respectively installed in each of the ring fuse socket 30 and another alarm fuse socket, such as a main fuse socket 80. Should the other alarm fuse 70 blow, that blown fuse can be simply removed from its socket 80 and (as shown by the broken lined arrows) swapped with the alarm fuse cartridge 50 installed in the ring fuse socket 30. This will readily enable that portion of the system previously served by the blown fuse 70 to become fully functional (assuming the cause of the blown fuse was corrected), while the blown fuse 70 still provides connectivity through the ring fuse socket 30.

This reduces the burden on the customer of having to locate or stock fuses for repair. For example, during installation of a system a wiring error may occur that blows the main fuse. After the wiring error is corrected, the blown fuse can be swapped with the ring fuse (which is not blown) and the system will become fully functional. The ring fuse socket will continue to enable or disable the ringing voltage based upon the presence or absence of a fuse cartridge.

Figure 5:
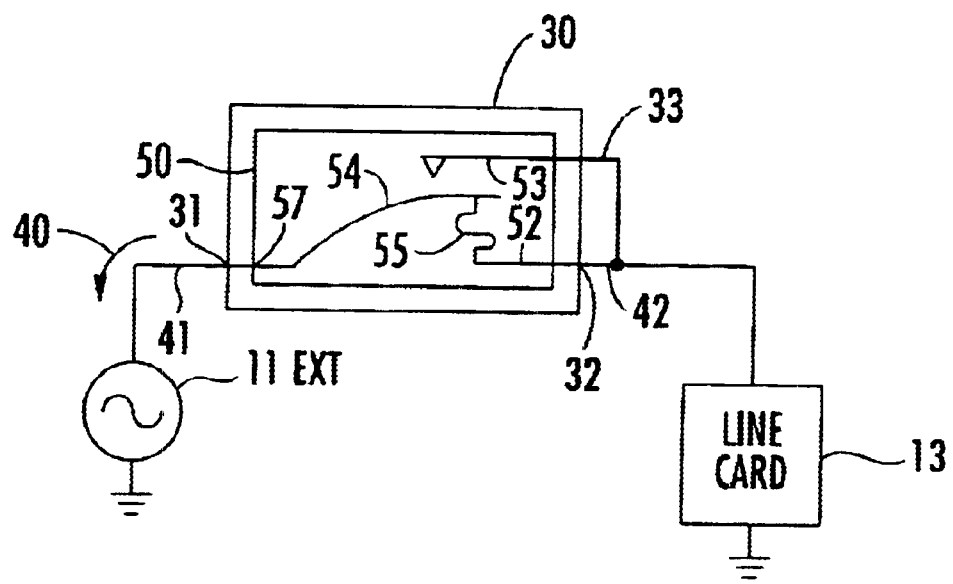
FIG. 5 diagrammatically illustrates a three-terminal fuse socket connected between an external ringing voltage generator and a line card for a second embodiment of the invention.

FIG. 5 diagrammatically illustrates a second embodiment of the invention, wherein the second (load) and third (alarm) terminals 32 and 33 are connected in common to the line card 13, while the first (source) fuse socket terminal 31 is connected to an external ringing voltage generator 11 EXT. As in the first embodiment of FIG. 2, the embodiment of FIG. 5 also directly interrupts the ring voltage when the ring fuse cartridge is removed from its socket. This embodiment may be employed in the case of an externally generated ringing voltage (outside of system). This method is less desirable than the first embodiment, since the ringing voltage is actually presented to the fuse (source electrode 51). Depending on the fuse design this could violate safety requirements. Furthermore, this approach only blocks the ringing voltage from reaching the line card. The source side of the fuse (and traces leading to it) still has a ringing voltage present. Another way to directly interrupt the ringing voltage (as in the case of an external source), without imposing a hazardous voltage on the fuse, is to have the fuse control a relay (which then interrupts the voltage).

The first embodiment of FIG. 2, described above, is preferred, since a hazardous voltage is not generated anywhere in the system once the ring fuse cartridge is removed from its socket. Still, the configuration of the socket of the embodiment of FIG. 5 is the same as the first embodiment, so as to effectively disable the fusing functionality and force the fuse cartridge to function as a simple switch. As in the first embodiment, the condition of the fusing element is irrelevant; application of the ringing voltage to the line card will be enabled or disabled by the insertion or removal of the fuse.

As will be appreciated from the foregoing description, the shock hazard potential associated with the substantially elevated ringing voltage present at a line card of a central office is effectively obviated in accordance with the present invention, by installing a three-terminal alarm fuse socket in a circuit path for the ringing generator, and wiring the socket's terminals to enable the fuse to operate as a switch. The switch is closed by inserting a (blown or unblown) three-pin alarm fuse. This enables a ringing voltage generated by the ringing voltage generator to be applied to the span and delivered to the ringing circuit of the handset. The switch is opened by removing the fuse.

Ringing voltage functionality for and/or connectivity with the ringing voltage circuit is selectively dependent upon whether a fuse is installed in the receptacle, irrespective of the state of the fuse. Moreover, configuring the ring fuse socket to accommodate a three-pin alarm-indicating type fuse in a non-standard 'switch' configuration allows the ring termination fuse to function as a system alarm fuse 'spare' and be swapped out for another alarm fuse that has blown. The ringing fuse socket will continue to enable or disable the ringing voltage depending on the presence or absence of a 'blown' or 'unblown' fuse cartridge.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. For use with a telephone instrument having an operational circuit that is adapted to be powered by way of a telecommunication link from a remote telecommunication facility, a method of selectively providing operational connectivity for a source of power for said operational circuit, said method comprising the steps of:

(a) providing a fuse having a first connectivity state between terminals thereof for a non-blown condition of said fuse, and having a second connectivity state between terminals thereof for a blown condition of said fuse;

(b) coupling a receptacle, that is adapted to receive said fuse of step (a), in an operation-enabling current flow path for said source of power, and is configured such that, for each of said non-blown and blown conditions of said fuse, said receptacle closes therethrough said operation-enabling current flow path; and (c) installing said fuse in said receptacle and thereby closing therethrough said operation-enabling current flow path.

2. A method according to claim 1, further including the step of:

(d) removing said fuse from said receptacle and thereby interrupting said operation-enabling current flow path.

3. A method according to claim 1, wherein step (b) comprises coupling said receptacle between said source of power and a line circuit for said telephone instrument.

4. A method according to claim 1, wherein step (b) comprises coupling said receptacle between said source of power and a voltage terminal that supplies an enabling input to said source of power.

5. A method according to claim 1, wherein said operational circuit comprises a ringing signal generator and step (b) comprises coupling said receptacle in series with a power source for said ringing signal generator.

6. A method according to claim 1, wherein said fuse has a first terminal, a second terminal and a third terminal, and a variable position conductor providing electrical connectivity between said first and second terminals for said non-blown condition of said fuse, and being operative to provide electrical connectivity between said first and third terminals for a blown condition of said fuse, and wherein step (b) includes configuring said receptacle such that said fuse, when installed in said receptacle in step (c), has said first terminal coupled to a first location of said operation-enabling current flow path, and has said second and third terminals coupled in common to a second location of said operation-enabling current flow path.

7. A method according to claim 1, wherein said operational circuit comprises a ringing signal generator, and said source of power comprises a ringing voltage generator.

8. A method of preventing shock hazard potential, associated with a substantially elevated ringing voltage present at a ringing voltage generator for a line card of a central office, during maintenance of telephony equipment, comprising the steps of:

(a) installing a three-terminal alarm fuse socket in a circuit path for a telephone handset's ringing signal generator powered by said ringing voltage;

(b) wiring terminals of said three-terminal alarm fuse socket installed in step (a) to enable a three-pin alarm fuse installed therein to operate as a switch; and (c) closing said switch by inserting a three-pin alarm fuse in said socket, irrespective of whether said three-pin alarm fuse is blown or unblown, so as to enable a ringing voltage generated by said ringing voltage generator to be delivered to said ringing signal generator circuit of said telephone handset.

9. A method according to claim 8, further including the step (d) of opening said switch by removing said fuse.

10. For use with a telephone instrument having a ringing signal generator circuit that is adapted to be powered over a telecommunication link from a ringing voltage generator at a remote telecommunication facility, said telephone facility including a circuit in which a three-pin alarm fuse is installable, a method of selectively providing operational connectivity for said ringing voltage generator comprising the steps of:

(a) coupling, in an operation-enabling current flow path for said ringing voltage generator, an alarm fuse receptacle that is adapted to have installed therein an alarm fuse, and is configured such that, for each of blown or non-blown conditions of an alarm fuse installed therein, said-receptacle closes said operation-enabling current flow path;

(b) installing an alarm fuse in said receptacle and thereby closing said operation-enabling circuit path therethrough.

11. A method according to claim 10, wherein step (b) comprises installing a non-blown alarm fuse in said receptacle, and further including the step of:

(c) in response to said three-pin alarm fuse being blown, swapping the non-blown alarm fuse installed in step (b) with the blown three-pin alarm fuse.

12. A method according to claim 10, further including the step of:

(c) removing said alarm fuse from said receptacle and thereby interrupting said operation-enabling current flow path.

13. A method according to claim 10, wherein step (a) comprises coupling said receptacle between said ringing voltage generator and a line circuit for said telephone instrument.

14. A method according to claim 10, wherein step (a) comprises coupling said receptacle between said ringing voltage generator and a voltage terminal that supplies an enabling input to said ringing voltage generator.

15. A method according to claim 10, wherein step (a) comprises coupling said receptacle in series with said ringing voltage generator and said ringing signal generator.

16. A method according to claim 10, wherein said alarm fuse has a first terminal, a second terminal and a third terminal, and a variable position conductor providing electrical connectivity between said first and second terminals for said non-blown condition of said alarm fuse, and being operative to provide electrical connectivity between said first and third terminals for a blown condition of said alarm fuse, and wherein step (a) includes configuring said receptacle such that said alarm fuse, when installed in said receptacle in step (b), has said first terminal coupled to a first location of said operation-enabling current flow path, and has said second and third terminals coupled in common to a second location of said operation-enabling current flow path.

17. An apparatus for selectively providing operational connectivity for a source of power from which a circuit of a telephone instrument is powered by way of a telecommunication link from a telecommunication facility, said apparatus comprising a fuse receptacle, that is adapted to receive a fuse having a first connectivity state between terminals thereof for a non-blown condition of said fuse, and a second connectivity state between terminals thereof for a blown condition of said fuse, said fuse receptacle being coupled in an operation-enabling current flow path for said source of power, and being configured such that, for each of said non-blown and blown conditions of said fuse installed therein, said receptacle closes said operation-enabling current flow path, whereas with said fuse removed from said receptacle, said operation-enabling current flow path is interrupted.

18. An apparatus according to claim 17, wherein said receptacle is coupled between said source of power and a line circuit for said telephone instrument.

19. An apparatus according to claim 17, wherein said receptacle is coupled between said source of power and a voltage terminal that supplies an enabling input to said source of power.

20. An apparatus according to claim 17, wherein said operational circuit comprises a ringing signal generator and said receptacle is coupled in series with a power source for said ringing signal generator.

21. For use with a telephone instrument having a ringing signal generator circuit that is adapted to be powered over a telecommunication link from a ringing voltage generator at a remote telecommunication facility, said telephone facility including a circuit in which a three-pin alarm fuse is installable, a circuit arrangement for selectively providing operational connectivity for said ringing voltage generator comprising an alarm fuse receptacle coupled in an operation-enabling current flow path for said ringing voltage generator, and adapted to have installed therein an unblown alarm fuse, and being configured such that, for each of blown or unblown conditions of an alarm fuse installed therein, said receptacle closes said operation-enabling current flow path, and wherein said receptacle is adapted to have said unblown alarm fuse replaced by said three-pin alarm fuse in a blown condition thereof, and to close said operation-enabling current flow path through said blown three-pin alarm fuse.

* * * * *